United States Patent
Kegasawa et al.

(10) Patent No.: US 7,090,479 B2
(45) Date of Patent: Aug. 15, 2006

(54) APPARATUS AND METHOD FOR MANUFACTURING RESIN MOLDED PRODUCT

(75) Inventors: Tadahiro Kegasawa, Fujinomiya (JP); Ryuichi Katsumoto, Fujinomiya (JP); Masanori Takase, Fujinomiya (JP); Yoshifumi Waki, Fujinomiya (JP); Kunihiko Kikuchi, Fujinomiya (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 263 days.

(21) Appl. No.: 10/410,343

(22) Filed: Apr. 10, 2003

(65) Prior Publication Data

US 2003/0193108 A1    Oct. 16, 2003

(30) Foreign Application Priority Data

Apr. 12, 2002    (JP) .............................. 2002-110818

(51) Int. Cl.
*B29C 47/06* (2006.01)
(52) U.S. Cl. .................... 425/133.5; 425/190; 425/380
(58) Field of Classification Search ............. 425/133.5, 425/190, 380
See application file for complete search history.

(56) References Cited

U.S. PATENT DOCUMENTS

| | | | | |
|---|---|---|---|---|
| 4,402,889 A | * | 9/1983 | Bonis | 264/37.32 |
| 4,426,344 A | * | 1/1984 | Dinter et al. | 264/173.15 |
| 4,652,225 A | | 3/1987 | Dehennau et al. | |
| 5,094,788 A | * | 3/1992 | Schrenk et al. | 264/173.15 |
| 5,102,323 A | * | 4/1992 | Blemberg | 425/133.5 |
| 5,120,484 A | * | 6/1992 | Cloeren | 264/173.12 |
| 5,190,711 A | * | 3/1993 | Blemberg | 264/173.13 |

FOREIGN PATENT DOCUMENTS

| JP | 6-122142 | * | 5/1994 |
|---|---|---|---|
| JP | 6-55402 | | 7/1994 |
| JP | 3112358 | | 9/2000 |

OTHER PUBLICATIONS

Japanese Abstract No. 10337765, dated Dec. 22, 1998.

* cited by examiner

*Primary Examiner*—Joseph S. Del Sole
(74) *Attorney, Agent, or Firm*—Sughrue Mion, PLLC (57) ABSTRACT

The manufacturing apparatus of a resin molded product has a feed block that sets a layer configuration of the resin molded product obtained by molding a plurality of molten resins. The feed block includes a feed block body having a through hole, and a plurality of replacement blocks that are removably fitted into the through hole and have layer configuring passages corresponding to different layer configurations. A replacement block before change is pushed out of the through hole by a replacement block having a layer configuring passage corresponding to a layer configuration after change, thereby changing the layer configuration. This allows an easy change of a layer configuration, and in particular, prevents degradation of resin due to heat or oxidation, and reduces time for the change and a material loss even when a significant change of the layer configuration such as a change of a layer arrangement is performed.

3 Claims, 5 Drawing Sheets

FIG.7 ic films or sheets, a change of resins
APPARATUS AND METHOD FOR MANUFACTURING RESIN MOLDED PRODUCT

BACKGROUND OF THE INVENTION

1. Field of the Invention

The present invention relates to apparatus and method for manufacturing a resin molded product, and more particularly to apparatus and method for manufacturing a resin molded product that allow an efficient change of a layer arrangement when a layer configuration is significantly changed, particularly when the layer arrangement is significantly changed.

2. Description of the Related Art

In a manufacturing apparatus that molds resin molded products such as plastic films or sheets, a change of resins to be supplied to an extrusion device, replacement of an entire feed block, a change of multi-manifold dies, replacement of an intermediate plug of the feed block, or the like have been performed in order to change a layer configuration such as the number of layers, a thickness of each layer, and/or an arrangement of layers. To perform these changes or replacement, the extrusion device requires to be stopped. The temperature is usually high in a process for molding a resin molded product, and stopping the extrusion device tends to cause heat degradation of a resin in the device. Further, the resin is exposed to air when the plugs are inserted into or removed from the device for replacement or the like, thereby promoting oxidation to further hasten the degradation. Heat degraded resin mixed into a product may cause a bad product. To prevent this, the temperature of the device has been lowered to a temperature that does not tend to cause the heat degradation or the oxidation for replacement. However, when the temperature is changed, the temperature requires to be increased for reuse, which may cause significant losses of time and material.

Specifically, when the layer configuration such as the number of layers, the thickness of each layer, or the arrangement of each layer are changed, the device that molds the resin molded product has mainly three problems: (1) the significant losses of time and material, (2) the heat degradation, and (3) the oxidation due to exposure to air, and there is a need for solving these problems.

For solving the problems, there have been proposed a method in which a replaceable adapter is mounted to a side surface of a die body, and replacement of the adapter changes a lamination order or the number of layers (Japanese Patent No. 3112358), and a method in which a selector plate that can be inserted or removed through a side surface is mounted between a junction block and a die, and replacement of the selector plate changes the number of layers or use/nonuse of an extrusion device (Japanese Patent Publication No. 6-55402).

However, the method in which the adapter is mounted to the side surface of the die body requires lowering the temperature of the device to a temperature that causes no degradation of resin when the adapter is replaced, which cannot eliminate the significant losses of time and material.

The method in which the selector plate that can be inserted or removed through the side surface is replaced tends to cause leakage at a connection between the junction block and the die, although the selector plate itself is compact and lightweight, and tight fastening for preventing the leakage requires much labor in next replacement.

In particular, the conventional methods cannot accommodate significant changes of the layer configuration such as a change of a layer arrangement from edge lamination in which a resin different from a resin at a center is placed at both ends of a resin molded product, to another layer arrangement, or vice versa.

SUMMARY OF THE INVENTION

The present invention has been achieved in view of the above, and has an object to provide apparatus and method for manufacturing a resin molded product that allow an easy change of a layer configuration, and particularly, prevent degradation of resin due to heat or oxidation, and reduce time for the change and a material loss even when a significant change of the layer configuration such as a change of a layer arrangement is performed.

In order to attain the above-described object, the present invention is directed to an apparatus for manufacturing a resin molded product, comprising: a feed block which sets a layer configuration of the resin molded product obtained by molding a plurality of molten resins, wherein the feed block comprises: a feed block body having a through hole; and a plurality of replacement blocks which are removably fitted into the through hole and have layer configuring passages corresponding to different layer configurations, wherein a replacement block before change is pushed out of the through hole by a replacement block having a layer configuring passage corresponding to a layer configuration after change, thereby changing the layer configuration.

According to the present invention, the feed block body has the through hole, and the replacement block having the layer configuring passage for setting the layer configuration is removably fitted into the through hole to form a nested structure. Thus, preparing the plurality of replacement blocks having the different layer configurations allows an easy change of the layer configuration simply by inserting and removing a replacement block corresponding to a desired layer configuration into and from the through hole. This reduces time for the change of the layer configuration and a material loss. Moreover, according to the present invention, the replacement block before change is pushed out of the through hole by the replacement block having the layer configuring passage corresponding to the layer configuration after change, thereby changing the layer configuration, which prevents air from entering the feed block body through the through hole when the replacement block is replaced. This prevents the degradation of the resin due to heat or oxidation. In this case, the feed block body has an inlet passage that introduces a molten resin supplied to the feed block into the layer configuring passage of the replacement block, and an outlet passage that supplies a multilayer resin having layers formed in the layer configuring passage to an extrusion die; however, openings of the passages are sealed by an outer surface of the replacement block when the replacement block is replaced, thus the resins in the passages are not exposed to air during the replacement to prevent oxidation.

For example, the layer configuration includes at least one of a number of layers, a thickness of each layer, and a layer arrangement of layers of the resin molded product.

Preferably, the feed block body and the replacement block support each other via a guide mechanism that is movable only in directions of inserting and removing the replacement block into and from the through hole. This allows continuous replacement while smoothly pushing the replacement block corresponding to the layer configuration before change by the replacement block corresponding to the layer configuration after change. Thus, the degradation of the resin can be prevented and a prompt change can be performed even for a significant change of the layer configuration, particularly for a significant change of the layer arrangement that tends to cause the degradation of the resin due to heat or oxidation, or the losses of replacement time and material. Therefore, the layer configuration can be changed more efficiently. Moreover, providing the guide mechanism allows the layer configuring passage formed on the replacement block to be precisely positioned with respect to the feed block body.

For example, one of the plurality of replacement blocks has a resin configuring passage for edge lamination in which a resin different from a resin at a center is placed at both ends of the resin molded product. Thus, a significant change of the layer arrangement such as a change between the layer arrangement with the edge lamination and the layer arrangement without the edge lamination can be promptly performed while preventing the degradation of the resin. Therefore, the losses of time and material can be reduced to allow an efficient change of the layer arrangement.

In order to attain the above-described object, the present invention is also directed to a method for manufacturing a resin molded product, wherein a film-like or a sheet-like resin film is manufactured using the above-described apparatus.

In order to attain the above-described object, the present invention is also directed to a method for manufacturing a resin molded product, wherein a film-like laminate having a metallic or a nonmetallic support laminated with a film-like or a sheet-like resin film is manufactured using the above-described apparatus.

According to the manufacturing method of the present invention, a resin film or a film-like laminate that has good quality and a good yield can be manufactured.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Now, a preferred embodiment of a manufacturing apparatus and a manufacturing method of a resin molded product as well as the resin molded product according to the present invention will be described with reference to the accompanying drawings.

Figure 1:
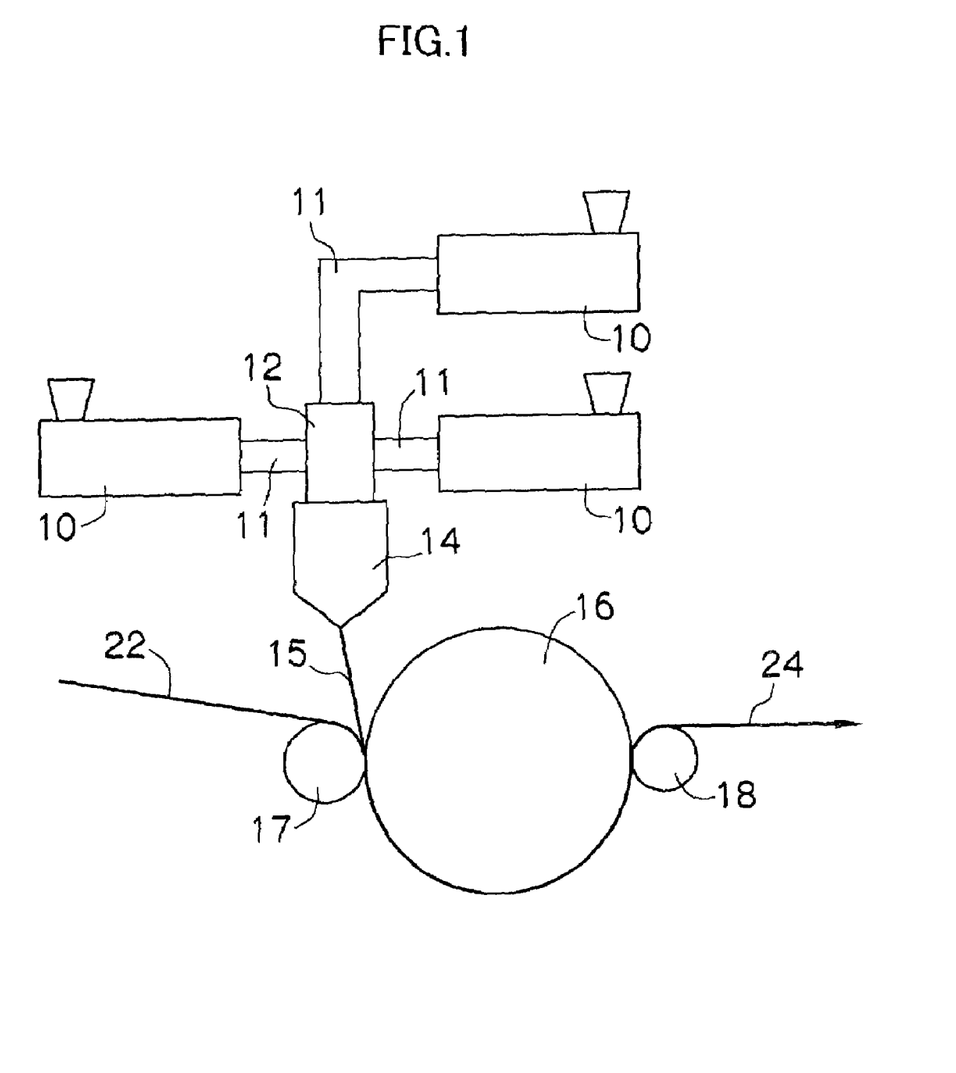
FIG. 1 shows an entire configuration for manufacturing a film-like laminate by a manufacturing apparatus of a resin molded product according to the present invention.

FIG. 1 shows an entire configuration of the manufacturing apparatus of the resin molded product, and an example of a manufacturing apparatus of a film-like laminate that has a support laminated with a resin film will be described.

As shown in FIG. 1, molten resins are extruded from extrusion devices 10, and after passing through pipes 11, a layer configuration is set in a feed block 12, and a resin film 15 is extruded from an extrusion die 14 that forms a resin film. Below the extrusion die 14, a cooling roller 16 and a nip roller 17 are placed adjacent to each other in parallel, and on an opposite side of the cooling roller 16 from the nip roller 17, a separation roller 18 is placed adjacent to the cooling roller 16 in parallel. The resin film 15 extruded from the extrusion die 14 is applied to a web-like support 22 transferred from upstream, then travels between the cooling roller 16 and the nip roller 17, and between the cooling roller 16 and the separation roller 18 while keeping contact with a peripheral surface of the cooling roller 16, and is separated from the cooling roller 16 at the separation roller 18. This produces a film-like laminate 24. Paper, resin or metal may be used as the support 22 depending on required film-like laminates 24.

A known thermoplastic resin including a polyolefin resin such as polyethylene or polypropylene may be used as a resin that forms the resin film 15.

Figure 2:
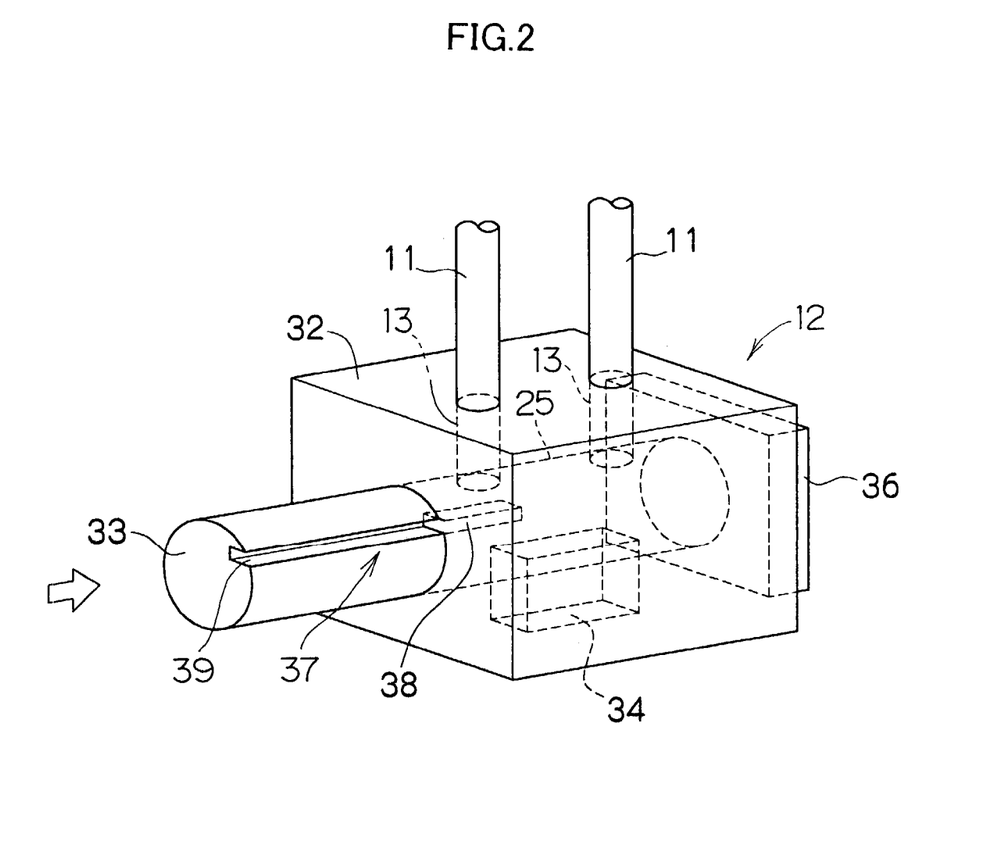
FIG. 2 illustrates a structure of a feed block in the manufacturing apparatus of the resin molded product.

FIG. 2 illustrates a structure of the feed block 12 that sets the layer configuration of the resin film, and shows an example of a layer configuration including two types of molten resins.

As shown in FIG. 2, the feed block 12 includes a feed block body 32 and a replacement block 33. The feed block body 32 has a through hole 25 into which and out of which the replacement block 33 is inserted and removed, and has an inlet passage 31 that provides communication between the through hole 25 and the pipes 11 and an outlet passage 34 that provides communication between the through hole 25 and the extrusion die 14. The replacement block 33 having a layer configuring passage 50 (see FIGS. 5 and 6) is removably fitted into the through hole 25 of the feed block body 32 to form a nested structure. On one side of the through hole 25, a plate 36 for connecting the replacement block 33 to the feed block body 32 is provided and fastened with a bolt (not shown) to a sidewall of the feed block body 32. The replacement block 33 and the feed block body 32 are usually connected at both sides of the through hole 25, but as shown in FIG. 2, it is convenient that the replacement block 33 and the feed block body 32 are connected at one end, and the replacement block 33 is shorter than the through hole 25 such that the replacement block 33 can be easily pushed into the through hole 25 at the other end when the replacement block 33 is replaced. For better sealing between the through hole 25 and the replacement block 33, at least one of an inner wall surface of the through hole 25 and an outer surface of the replacement block 33 is preferably coated with a sealant.

The feed block body 32 and the replacement block 33 support each other via a guide mechanism 37 that is movable only in the directions of inserting and removing the replacement block 33 from the through hole 25. The guide mechanism 37 includes a protruded guide member 38 that is formed in the directions of inserting and removing the replacement block 33 on the inner wall surface of the through hole 25 of the feed block body 32, and a recessed guide groove 39 that is formed on the replacement block 33 correspondingly to the guide member 38. Thus, the guide groove 39 of the replacement block 33 is guided by the guide member of the through hole 25, thus allowing the replacement block 33 to be smoothly inserted into and removed from the through hole 25.

The feed block 12 configured as described above causes the molten resins supplied from the pipes 11 to flow into the inlet passage 31 in the feed block body 32, and be merged in the layer configuring passage 50 in the replacement block 33 that sets the layer configuration to set the layer configuration in the layer configuring passage 50. A multilayer molten resin with the set layer configuration flows from the outlet passage 34 into the extrusion die 14, and is extruded from a slit (not shown) of the extrusion die 14 to be applied on the support 22.

Figure 3A:
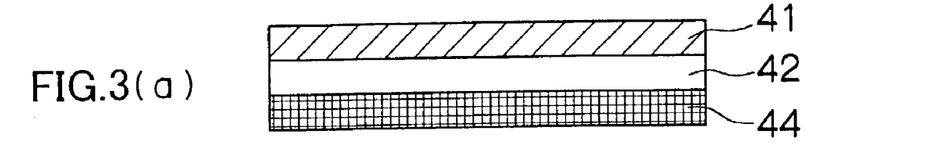
FIGS. 3(a), 3(b) and 3(c) schematically show layer configurations of the film-like laminate extruded from an extrusion die.
Figure 3B:
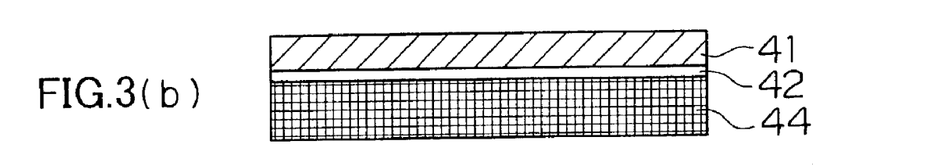
Figure 3C:
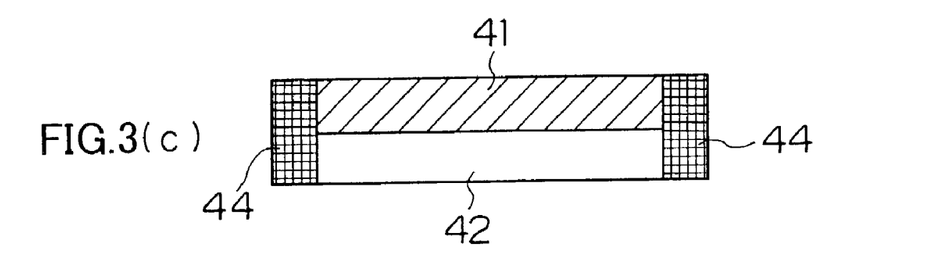

FIGS. 3(a), 3(b) and 3(c) show layer configurations of a resin part after lamination, and FIG. 3(a) shows a three layered film or sheet having layers with the same thickness (hereinafter referred to as a layer configuration (a)), FIG. 3(b) shows a three layered film or sheet having layers with different thicknesses (a layer configuration (b)), and FIG. 3(c) shows a three layered film or sheet having lamination of a different type of resin on both sides along a width (a layer configuration (c)).

Figure 4:
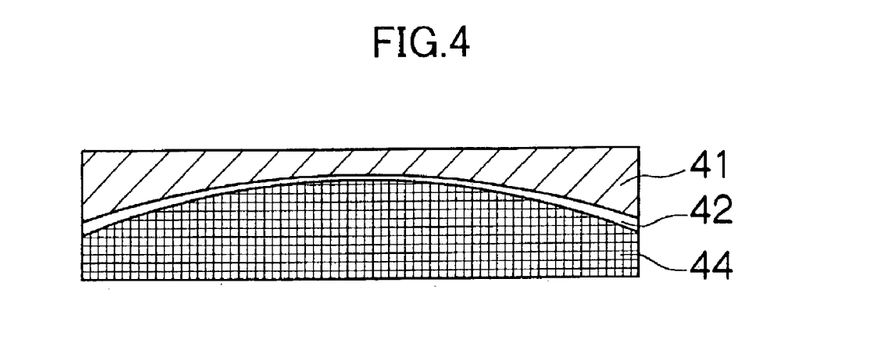
FIG. 4 schematically shows curved interfaces between layers.

When the layer configuration (layer thickness) (a) is changed to the layer configuration (b), changing flow rates of resins corresponding to layers 41, 42, 43 can accommodate a case where the layers 41, 42, 43 have small differences in properties of the resins and a little difference of thicknesses, for example, a case where the layers 41, 42, 43 have the same viscosity, and a ratio of the layer thicknesses is 1:1.3:1.2. However, when the layers 41, 42, 43 have large differences in the properties of the resins and/or a large difference of the layer thicknesses, simply changing the flow rates of the resins corresponding to the layers 41, 42, 44 does not tend to provide even layer thicknesses, and tends to cause curves of interfaces between the layers 41 and 42 and between the layers 42 and 43 as shown in FIG. 4. To prevent the curves, adjusting resin temperatures corresponding to the layers 41, 42, 43 to reduce the differences in the properties may work, but the resin temperatures are usually set definitely from performance required for an end product, and a range of adjustment is narrow. Thus, it is difficult to obtain the even layer thicknesses by adjusting the resin temperatures corresponding to the layers 41, 42, 44.

As another method for preventing the curves of the interfaces, a shape of the layer configuring passage 50 that sets the layer configuration of the layers 41, 42, 44 may be changed to merge the layers in a form opposite from the curving direction. For this purpose, the layer configuration is changed depending on layer thicknesses required for products. Moreover, when the layer configuration is changed, it is required to prevent degradation of the resin due to heat or oxidation and to reduce changing time and a material loss.

Figure 5:
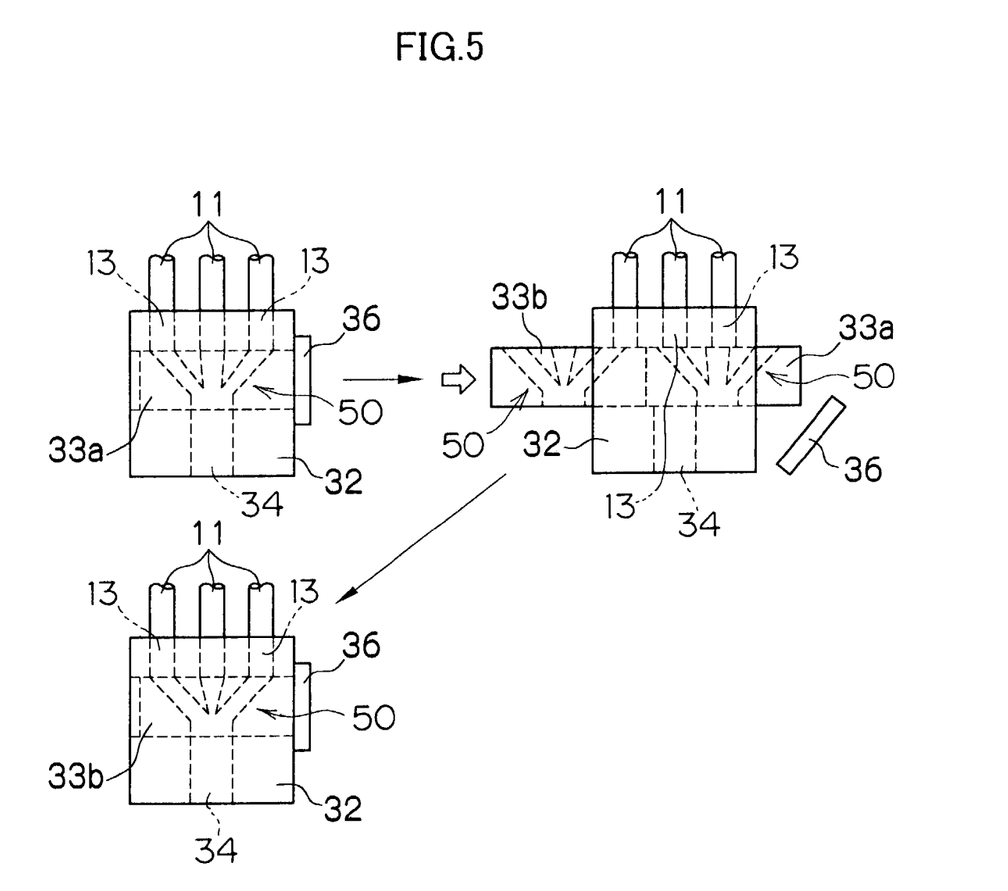
FIG. 5 illustrates an example of a change of a layer configuration using the feed block according to the present invention, and shows a procedure of a change layer configurations from (a) to (b)
Figure 6:
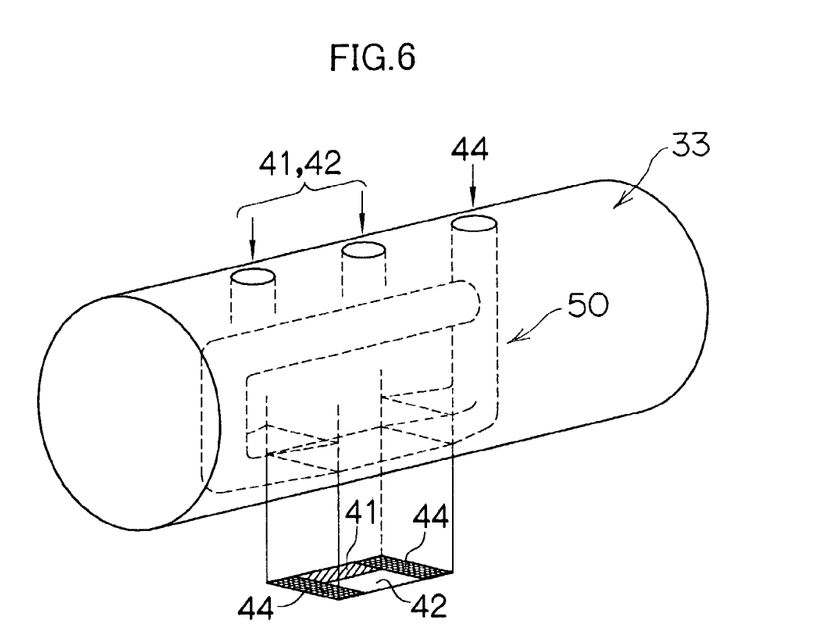
FIG. 6 schematically illustrates the example of the change of the layer configuration using the feed block according to the present invention, and shows a replacement block used for changing layer configurations from (a) to (c)

FIG. 5 shows an example of a procedure when the layer configuration (a) is changed to the layer configuration (b) using the feed block 12 according to the present invention.

First, the bolt (not shown) that connects a replacement block 33a fitted into the through hole 25 of the feed block body 32 to the feed block body 32 is loosened to remove the plate 36, and the replacement block 33a is released and both ends of the through hole 25 are exposed. A replacement block 33b for replacement is pushed into the through hole 25 from the end of the through hole 25 opposite from the end to which the plate 36 was connected, and the replacement block 33a having been fitted into the through hole 25 is pushed out of the through hole 25. Thus, the replacement block 33a that sets the layer configuration (a) can be replaced by the replacement block 33b that sets the layer configuration (b). Thus, the replacement block 33a may be continuously replaced by the replacement block 33b, thereby preventing air from entering the feed block body 32 through the through hole 25 during the replacement. Therefore, the resins in the feed block body 32 are not exposed to the air, thus preventing the degradation of the resins during the replacement.

For the replacement of the replacement block 33, diameters of the replacement block 33 and the through hole 25 provided in the feed block body 32 are preferably as close as possible in order to prevent leakage of the resin from a gap, but too small a difference between the diameters of the replacement block 33 and the through hole 25 makes inserting and removing the replacement block 33 difficult. In such a case, the replacement block 33 may be replaced manually using a hydraulic jack, or automatically using a hydraulic cylinder, and combination with these devices allows easy replacement. At least one of the inner wall surface of the through hole 25 and the outer surface of the replacement block 33 is preferably coated with a slippery sealant.

The above procedure has been described with respect to changing the layer thickness. As previously described, the problem of the curve of the interfaces between the layers may be also solved by replacement of the replacement blocks 33 having different layer configuring passages 50. When the layer configuration (a) is changed to the layer configuration (c), the replacement block 33 may be replaced by a replacement block 33 shown in FIG. 6 having a layer configuring passage 50 that can flow a molten resin that forms layers 44 at both ends into the both ends of a position where molten resins that form two layers 41, 42 at the center flow. In the related art, changing the layer arrangements between (a) and (c) has required replacement of a die, replacement of the entire feed block, or replacement of several parts in the feed block, which take much time. On the other hand, using the feed block 12 having the structure according to the present embodiment allows such a significant change of the layer configuration to be promptly performed.

Further, it is known that when the operation of the extrusion device 10 that has been stopped for increasing the number of layers is resumed, resins in the extrusion device 10 that has been stopped are extremely degraded to generate a large amount of degraded resins after the change of the number of layers, and removing the degraded resins takes much time.

Figure 7:
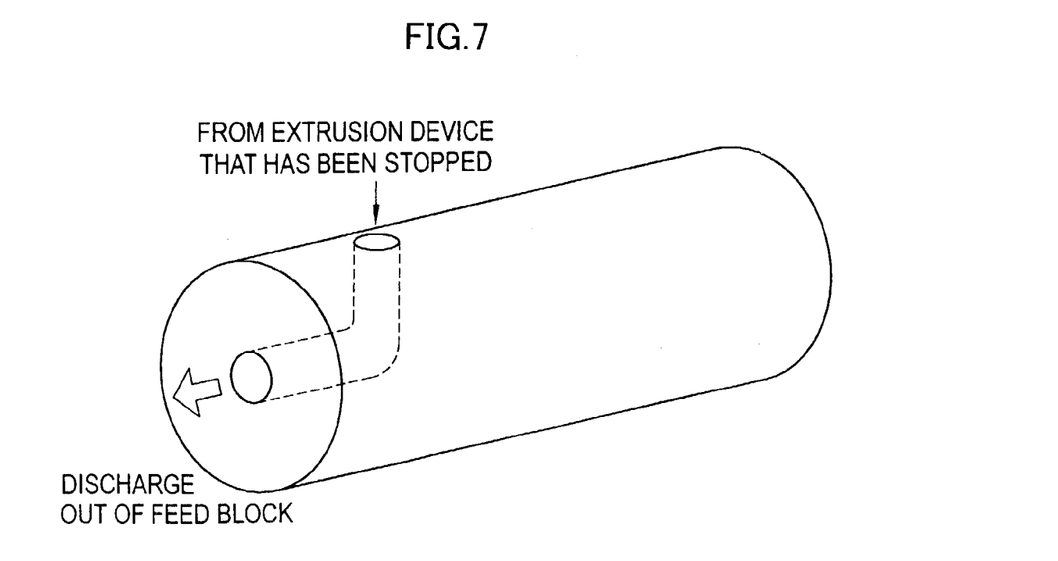
FIG. 7 schematically shows a replacement block for discharging degraded resin out of the feed block.

On the other hand, a replacement block 33 shown in FIG. 7 that has a structure for discharging a degraded resin can be pushed into the through hole 25 to prevent the degraded resin from entering the feed block body 32 or the extrusion die 14. Although a series of operations in which the degraded resin is sufficiently discharged by the replacement block 33 for discharging the degraded resin and then the replacement block 33 is replaced by a replacement block 33 corresponding to a desired layer configuration prolongs replacement time of the replacement block 33, it can reduce time for removing the degraded resin, thereby reducing the replacement time and the material loss as a whole.

The above-described replacement blocks 33 are cylinders; however, a shape of the replacement block 33 is not limited to the cylinder as long as it corresponds to the shape of the through hole 25, which may be a prism, for example.

In the above-described embodiments, the film-like laminate 24 that has the support 22 laminated with the resin film 15 is described; however, the present invention may be applied to a device that manufactures a film-like product or a polyester product, or a coating device that discharges a film-like coating liquid to coat the support.

EXAMPLES

Next, detailed examples of using the manufacturing apparatus of the resin molded product according to the present invention will be described.

A resin for a test is a low density molten polyethylene with MFR of 10 g/10 min and density of 0.917 g/cm$^3$ mixed with 10 wt % of titanium oxide, and is molded at a resin temperature of 310° C.

MFR is calculated as the number of grams of a thermoplastic resin that is extruded from an orifice having a 2.1 mm diameter and an 8 mm length for ten minutes when the thermoplastic resin is exposed to a 2310 g force (44 psi) at 230° C. (for the measuring method, see JIS K 7210, ASTMD1238). Generally, a higher MFR resin has higher fluidity and workability, but has lower tensile strength.

Comparative Example 1

In order to manufacture a film-like resin film using the above-described resin, a feed block having a conventional merging structure was used to form a layer configuration that has two layers with a layer thickness ratio of 1:1 in the feed block, which was extruded from an extrusion die to manufacture a product. Then, in order to change the layer thickness ratio of the two layers to 5:1, a merging area of the two layers in the feed block was replaced. When the merging area was replaced, in order to prevent exposure to air and degradation of the resin in the area, a section between the extrusion device and the extrusion die was cooled to 180° C. to replace the merging area, and after the replacement, the section between the extrusion device and the extrusion die was heated to 310° C., then degraded resin was discharged until the degraded resin generated in the feed block was eliminated.

Example 1

In order to form a film-like resin film using the above-described resin, a feed block having a replacement block according to the present invention was used to form a layer configuration that has two layers with a layer thickness ratio of 1:1 in the feed block, which was extruded from an extrusion die to manufacture a product. Then, in order to change the layer thickness ratio of the two layers to 5:1, the replacement block was replaced by a replacement block corresponding to the layer thicknesses. When the replacement block is replaced, the resin in the feed block body is not directly exposed to the air, and thus the temperature does not require to be lowered. However, in view of replacement workability, a section between the extrusion device and the extrusion die was cooled to 260° C. to replace the replacement block, and after the replacement, the section between the extrusion device and the extrusion die was heated to 310° C., then degraded resin was discharged until the degraded resin generated in the feed block was eliminated.

Comparative Example 2

In order to manufacture a film-like resin film using the above-described resin, a feed block having a conventional structure was used to cause the resin in one layer to flow in the feed block, which was extruded from an extrusion die to manufacture a product. Then, in order to change the number of layers to two with a layer thickness ratio of 1:1, an area that forms a layer configuration in the feed block was replaced. A section between the extrusion device and the extrusion die that had been used was cooled to 180° C., and the section between the extrusion device and the pipe that had been stopped was heated to 180° C. to replace the area that forms the layer configuration, and after the replacement, the section between all of the extrusion devices and the die was heated to 310° C., then degraded resin was discharged until the degraded resin generated in the feed block was eliminated.

Example 2

In order to manufacture a film-like resin film using the above-described resin, a feed block having a replacement block according to the present invention was used to cause the resin in one layer to flow in the feed block, which was extruded from an extrusion die to manufacture a product. Then, in order to change the number of layers to two with a layer thickness ratio of to 1:1, the replacement block was replaced by a replacement block corresponding to the number of layers. When the replacement block is replaced, the resin in the feed block body is not directly exposed to the air, and thus, practically, the temperature does not require to be lowered. However, in view of replacement workability, a section between the extrusion device and the extrusion die that had been used was cooled to 260° C., and the section between the extrusion device and the pipe that had been stopped was heated to 260° C. to replace the replacement block with the corresponding replacement block, and after the replacement, the section between all of the extrusion devices and the extrusion die was heated to 310° C., then degraded resin was discharged until the degraded resin generated in the feed block was eliminated.

Example 3

In order to manufacture a film-like resin film using the above-described resin, a feed block having a replacement block according to the present invention was used to cause the resin in one layer to flow in the feed block, which was extruded from an extrusion die to manufacture a product. Then, in order to change the number of layers to two with a layer thickness ratio of to 1:1, the replacement block was first replaced by a replacement block for discharging degraded resin in the extrusion device that had been stopped out of the feed block. When the replacement block for discharge is replaced, the resin in the feed block body is not directly exposed to the air, and thus, practically, the temperature does not require to be lowered. However, in view of replacement workability, a section between the extrusion device and the extrusion die that had been used was cooled to 260° C., and the section between the extrusion device and the pipe that had been stopped was heated to 260° C. to replace the replacement block with the replacement block for discharging the degraded resin, and after the replacement, the degraded resin was discharged until the degraded resin was eliminated. Then, the replacement block was replaced by a replacement block corresponding to the two layer arrangement with a layer thickness ratio of 1:1, and after the replacement, the section between all of the extrusion devices and the extrusion die was heated to 310° C., then the degraded resin was discharged until the degraded resin was eliminated.

Comparative Example 3

In order to manufacture a film-like resin film using the above-described resin, a feed block having a conventional merging structure was used to form a layer configuration that has two layers with a layer thickness ratio of 1:1 in the feed block, which was extruded from an extrusion die to manufacture a product. Then, in order to change the layer thickness ratio of the two layers to 5:1, the feed block was replaced by a feed block that forms the layer thicknesses. When the entire feed block is replaced, in order to prevent degradation of resin in the extrusion device, a section between the extrusion device and the extrusion die was cooled to 180° C. to replace the feed block, and after the replacement, the section between the extrusion device and the die was heated to 310° C., then degraded resin was discharged until the degraded resin generated in the feed block was eliminated.

Results

Then, for Examples 1 to 3 and Comparative Examples 1 to 3, time for the temperature change, time for each replacement of the merging area, the replacement block, and the entire feed block, and time for discharging the degraded resin after the replacement are summed, and total time for changing the layer configuration was evaluated.

layers, the total time was able to be reduced by 2.2 hours to 4.3 hours from 6.5 hours in Comparative Example 2.

Further, as seen from the comparison between Comparative Example 2 and Example 3, it became apparent that when the number of layers is changed from one to two, the replacement block for discharging the resin that has not been used for a time out of the feed block is used in Example 3 to provide longer time for the replacement of the replacement block compared to Comparative Example 2; however, it provides shorter total time for changing the layer configuration. Using the replacement block that discharges the degraded resin prevents the degraded resin from entering the extrusion die, thus it can be expected that a product with higher quality be manufactured.

As seen from Comparative Example 3, the method for replacing the entire feed block in order to change the layer configuration takes much time and causes the material loss. As seen from the comparison between Comparative Example 3 and Example 1, in Example 1 using the feed block having the replacement block according to the present invention, the total time for changing the layer configuration was able to be reduced by half or less compared to Comparative Example 3.

As described above, according to the manufacturing apparatus and the manufacturing method of the resin molded product of the present invention, even in the significant change of the layer configuration, the resin is not exposed to the air during the replacement of the replacement block that sets the layer configuration, thus preventing the oxidation, and requiring a low temperature for cooling the device during the replacement. The replacement block can be

TABLE 1

|  | Change of layer configuration | Time for temperature change [hour] | Time for replacement of merging area/part, and feed block [hour] | Time for discharging degraded resin [hour] | Total time for changing layer configuration [hour] |
|---|---|---|---|---|---|
| Comparative Example 1 | Two layer ratio of 1:1 to 5:1 | 4 | 0.5 | 1 | 5.5 |
| Example 1 | Two layer ratio of 1:1 to 5:1 | 2.2 | 0.3 | 0.5 | 3 |
| Comparative Example 2 | One layer to two layers | 4 | 0.5 | 2 | 6.5 |
| Example 2 | One layer to two layers | 2.5 | 0.3 | 1.5 | 4.3 |
| Example 3 | One layer to two layers | 2.5 | 0.6 | 1 | 4.1 |
| Comparative Example 3 | Two layer ratio of 1:1 to 5:1 | 4 | 3.5 | 0.5 | 8 |

When the feed block having the replacement block according to the present invention is used to change the layer configuration so as to change the layer thickness ratio of the two layers from 1:1 to 5:1, the resin is not exposed to the air during the replacement of parts to prevent oxidation. Hence, as seen from the comparison between Comparative Example 1 and Example 1, the temperature reduction in cooling down becomes less to reduce the time for discharging the degraded resin, and the time for the replacement of the replacement block. Therefore, in Example 1, the total time for changing the layer configuration was able to be reduced by 1.5 hours to 3 hours from 5.5 hours in Comparative Example 1.

As seen from the comparison between Comparative Example 2 and Example 2, when the feed block having the replacement block according to the present invention was used to change the layer configuration from one layer to two smoothly replaced to reduce the time for the replacement, thus reducing the total time for changing the layer configuration.

This allows the prompt change of the layer configuration, saves time and material, and increases productivity.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An apparatus for manufacturing a resin molded product, comprising:
   a feed block which sets a layer configuration of the resin molded product obtained by molding a plurality of molten resins, wherein the feed block comprises:

a feed block body having a through hole;

a plurality of replacement blocks which are removably fitted into the through hole and have layer configuring passages corresponding to different layer configurations, wherein each replacement block has a length that substantially fills the through hole, a plate covering an end of the through hole and connected to a sidewall of the feed block, and a means for continuously replacing a first replacement block with a second replacement block through the through hole in a direction toward the plate.

2. The apparatus according to claim 1, wherein the feed block body and the replacement block support each other via a guide mechanism that is movable only in directions of inserting and removing the replacement block into and from the through hole.

3. The apparatus according to claim 1, wherein one of the plurality of replacement blocks has a resin configuring passage for edge lamination in which a resin different from a resin at a center is placed at both ends of the resin molded product.

* * * * *